United States Patent

Yoshimura

[11] Patent Number: 5,211,969
[45] Date of Patent: May 18, 1993

[54] MOLD FOR PRESS MOLDING OF OPTICAL ELEMENT

[75] Inventor: Fumitaka Yoshimura, Yokohama, Japan

[73] Assignee: Canon Kabushiki Kaisha, Tokyo, Japan

[21] Appl. No.: 785,766

[22] Filed: Oct. 31, 1991

[30] Foreign Application Priority Data

Nov. 2, 1990 [JP] Japan .................... 2-295233
Nov. 2, 1990 [JP] Japan .................... 2-295234

[51] Int. Cl.$^5$ .................................... B29D 11/00
[52] U.S. Cl. .............................. 425/395; 65/305; 264/2.7; 425/408; 425/411; 425/808
[58] Field of Search ............ 425/395, 408, 411, 233, 425/808; 264/1.1, 2.2, 2.7; 65/318, 323, 320, 305

[56] References Cited

U.S. PATENT DOCUMENTS

| | | | |
|---|---|---|---|
| 1,569,689 | 1/1926 | Vannoni | 425/411 X |
| 2,290,917 | 7/1942 | Smith | 425/808 X |
| 2,298,429 | 10/1942 | Smith | 65/318 X |
| 4,557,889 | 12/1985 | Masuda et al. | 425/411 X |
| 4,756,737 | 7/1988 | Yoshimura et al. | 65/275 |
| 4,836,840 | 6/1989 | Hirota et al. | 65/323 |
| 4,883,528 | 11/1989 | Carpenter et al. | 264/2.7 X |
| 4,913,718 | 4/1990 | Yoshimura et al. | 65/104 |
| 4,932,857 | 6/1990 | Nishino et al. | 425/408 X |
| 5,015,280 | 5/1991 | Kimoto et al. | 425/808 X |

FOREIGN PATENT DOCUMENTS

61-21926 1/1986 Japan .................... 65/323
61-174127 8/1986 Japan .

*Primary Examiner*—Richard L. Chiesa
*Attorney, Agent, or Firm*—Fitzpatrick, Cella, Harper & Scinto

[57] ABSTRACT

A mold structure for press molding, including an upper mold member and a lower mold member in a sleeve member in longitudinally slidable manner. The mold includes a member for limiting the movement of the lower mold member with respect to the sleeve member in a direction in which the lower mold member is separated from the upper mold member, and a ring member mounted on the upper end face of the sleeve member. The ring member is provided, in the longitudinal direction of the sleeve member, with at least three penetrating holes in which pins with same length are detachably inserted, and the upper mold member has an impinging face to be brought into contact with the pins in the pressing operation, thus determining the thickness of the molded article.

4 Claims, 6 Drawing Sheets

MOLD FOR PRESS MOLDING OF OPTICAL ELEMENT

BACKGROUND OF THE INVENTION

1. Field of the Invention

The present invention relates to the structure of a mold for press molding, and more particularly to such structure capable of maintaining a satisfactory precision in thickness of the molded article and also maintaining a long service life of the mold. The present invention is advantageously applicable, for example, to a mold for rapidly producing an optical element with optically functional surface from a molding material by pressing.

2. Related Background Art

There has recently been developed a method of producing an optical element provided with an optically functional face, by placing a molding material, such as a glass blank pre-molded to the shape and surface precision of a certain extent, in a mold of a desired surface precision and press molding said material under heating, thereby dispensing with post-finishing such as grinding and polishing.

Said press molding method consists of the steps of: positioning at least a pair of mold members so as to be capable of reciprocating in an opposite direction, relatively introducing a molding material into a cavity formed by members including said paired mold members; establishing a non-oxidative atmosphere, for example, nitrogen atmosphere for preventing the oxidation of the mold member; heating the mold members to a temperature enabling the molding, for example, a temperature where the viscosity of the molding material becomes to $10^8$ to $10^{12}$ poise; closing the mold members and effecting the pressing for a suitable period thereby transferring the surface form of the mold members to the molding material; then cooling the mold members to a temperature sufficiently lower than the glass transition temperature of the molding material; and removing the pressing pressure, to take out the molded optical element by opening the mold members.

The press molding method explained above enables to produce, for example, aspherical lens which has been extremely expensive, with a relatively low cost.

In the mold members for the press molding explained above, the thickness of the molded article, namely the thickness in a direction along which said paired mold-members are mutually opposed, is determined by stop position where said paired mold members are stopped to move in the mutual opposed directions upon pressing operation. Conventionally, a sleeve-shaped cylindrical mold member is employed for setting said stop position, and the thickness of the molded article is determined by impingement of the paired mold members directly or indirectly to said cylindrical mold member, or by fixing one of the paired mold members with said cylindrical mold member and impinging the other on said cylindrical mold member.

Such structure is disclosed for example in the Japanese Patent Laid-open Application No. 61-174127 and the Japanese Utility Model Laid-open Application No. 62-203235.

In such conventional structure, however, the impingement between the cylindrical mold member and at least one of the paired mold members takes place over an entire end face of the cylindrical mold member, and eventual presence of foreign matters such as dusts or fragments of molding material on said wide impinging face will hinder obtaining the proper stop position in the pressing operation. Particularly, after repeated pressing operations, there often results significant deterioration in the precision of stop position because of increase of such foreign matters on the impinging face, or damage on the impinging face by said foreign matters, leading to a shortened service life of the mold members.

SUMMARY OF THE INVENTION

In consideration of the foregoing drawbacks in the prior art, a first object of the present invention is to provide a mold structure for press molding, enabling constantly precise setting of stop position of the paired mold members at the relative movement thereof upon pressing operation, thereby maintaining a satisfactory precision of thickness of the molded article and also maintaining a long service life of the mold members.

A second object of the present invention is to provide a mold structure for press molding, enabling constantly precise setting of stop position in the relative movement of upper and lower mold members in a pressing operation thereby maintaining a satisfactory precision in thickness of the molded article, also enabling volatile component from the molding material to escape from the cavity of the mold members thereby obtaining a molded article with satisfactory surface state, and enabling to maintain a long service life of the mold members.

The foregoing objects can be attained, according to the present invention, by a mold structure for press molding, having an upper mold member, a lower mold member and a sleeve member in which said lower mold member is longitudinally slidably positioned;

wherein a part of an annular upper end portion of said sleeve member is adapted to impinge on a spherical or flat annular edge portion which is common with a transfer molding face of said upper mold members, and another part of said upper end portion of said sleeve member is formed as a notched portion for making a gap on said annular edge portion of the upper mold member in said impinging state.

In the present invention, there is also provided an embodiment in which said lower mold member is prevented from rotation in the circumferential direction around the longitudinal direction of said sleeve member, said sleeve member is provided with plural notches spaced at same interval along the circumference thereof, and the annular edge portion of said upper mold member is provided with a protruding part engageable with one of the plural notches of the sleeve member.

Also, the foregoing objects can be attained, according to the present invention, by a mold structure for press molding, having an upper mold member, a lower mold member and a sleeve member in which said lower mold member is longitudinally slidably positioned;

wherein a part of a spherical or flat annular edge portion which is common with the transfer molding fact of said upper mold member is adapted to impinge on an annular upper end portion of said sleeve member, and another part of said annular edge portion of said upper mold member is formed as a notched portion for making a gap on the upper end portion of said sleeve member in said impinging state.

In the present invention, there is also provided an embodiment in which said lower mold member is prevented from rotation in the circumferential direction around the longitudinal direction of said sleeve member, said upper mold member is provided with plural notches spaced at same interval along the circumference thereof, and the upper end portion of the sleeve member is provided with a protruding engageable with one of the plural notches of the upper mold member.

Furthermore, the foregoing objects can be attained, according to the present invention, by a mold structure for press molding, having a sleeve member in which an upper mold member and a lower mold member are longitudinally slidably positioned, comprising:

means for limiting the movement of said lower mold member with respect to said sleeve member, in a direction in which the lower mold member is separated from said upper mold member; and a ring member mounted on the upper end face of said sleeve member, said ring member being provided at least three penetrating holes in the longitudinal direction of said sleeve member and pins with same length being detachably inserted respectively in said penetrating holes;

wherein said upper mold member is provided with an impinging face to be brought into contact with said pins for setting the thickness of the molded article.

In the present invention, there is also provided an embodiment in which said penetrating holes are spaced at same interval along the circumference of said ring member.

There is also provided an embodiment in which said upper mold member is provided, at the upper part thereof and on the vertical central axis of the sleeve member, with a protruding part for receiving the pressing force applied thereto from above.

There is furthermore provided an embodiment in which the upper end face of said sleeve member and the impinging face of said upper mold member lie in planes perpendicular to the longitudinal direction of said sleeve member.

DESCRIPTION OF THE PREFERRED EMBODIMENTS

Now, the present invention will be clarified in detail by embodiments thereof, applied to the press molding of an optical lens and shown in the attached drawings.

Figure 1:
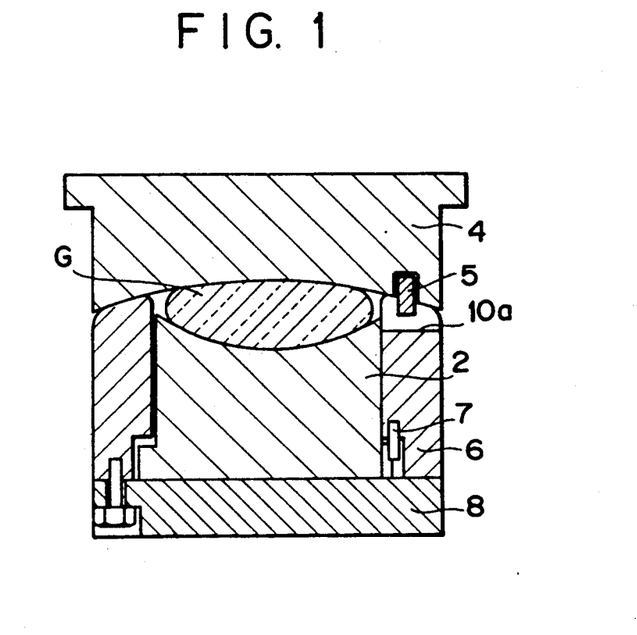
FIG. 1 is a longitudinal cross-sectional view of a mold structure for press molding, constituting a first embodiment of the present invention.
Figure 2:
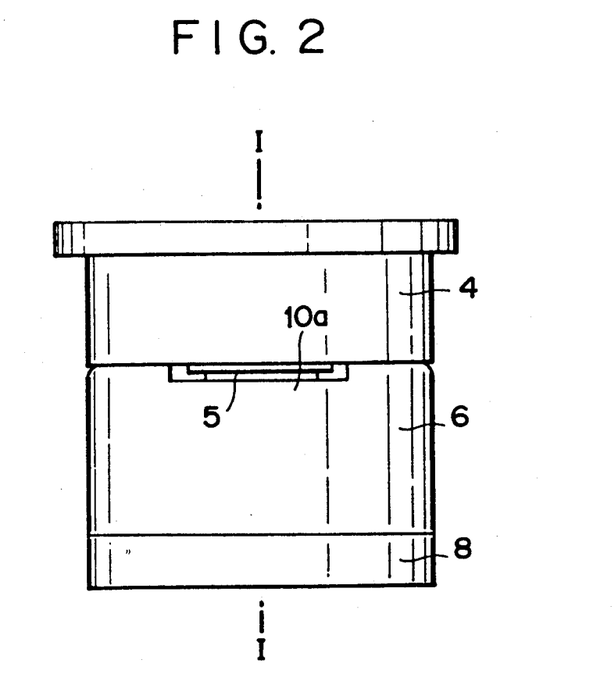
FIG. 2 is an elevation view of FIG. 1.

FIG. 1 is a longitudinal cross-sectional view of a mold structure for press molding, constituting a first embodiment of the present invention, and FIG. 2 is an elevation view thereof. FIG. 1 corresponds to the cross section along a line I—I in FIG. 2.

In these drawings, a lower mold member 2 is provided with an upper molding face finished with a desired surface precision, in order to transfer and form a first optically functional face of a lens. Said molding face may be formed aspherical. An upper mold member 4 is provided with a lower molding face finished with a desired surface precision, in order to transfer and form a second optically functional face of the lens. Said molding face is spherical or flat. These mold members 2, 4 constitute paired mold members.

A sleeve member 6 supports said lower mold member 2 in vertically slidable manner.

At the lower end of the sleeve member 6 there is fixed a support plate 8, which limits the movement of said lower mold member 2 in the downward direction. The lower part of a pin 7 mounted on the sleeve member 6 engages with a vertical groove formed on a lateral surface of the lower mold member 2. Thus, the lower mold member 2 is prevented from rotation with respect to the sleeve member around the longitudinal direction of thereof.

There is also shown a molding material G.

Figure 3:
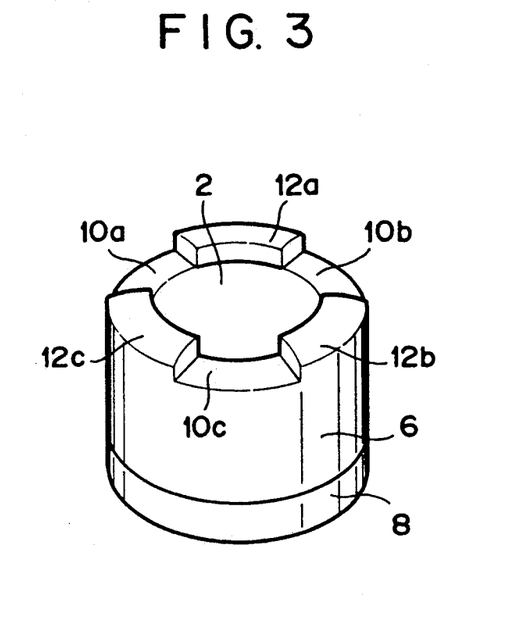
FIG. 3 is a perspective view of said first embodiment, in which an upper mold member and the molding material are not shown.

FIG. 3 is a perspective view of the present embodiment, wherein said upper mold member 4 and the molding material G are not shown.

On the annular upper end portion of the sleeve member 6 there are formed three notches 10a, 10b, 10c. Unnotched parts 12a, 12b, 12c of said annular upper end portion have an upper end face of a shape corresponding to that of the molding face of said upper mold member 4. The upper end face of the unnotched parts 12a, 12b, 12c are adapted to impinge on an annular edge portion at the peripheral circumference of the molding face of said upper mold member 4 upon the pressing operation. The notches 10a, 10b, 10c and the unnotched parts 12a, 12b, 12c have a same circumferential length.

Figure 4:
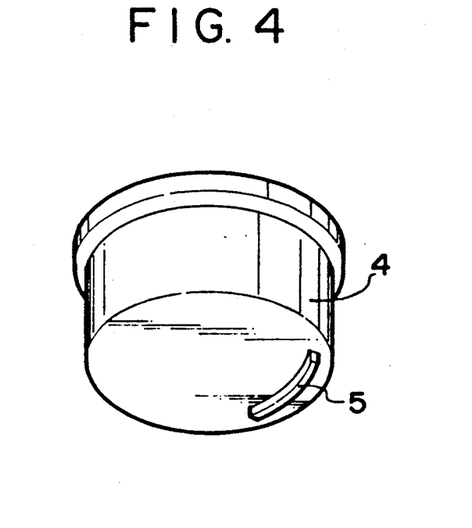
FIG. 4 is a perspective view of said upper mold member of said first embodiment.

FIG. 4 is a perspective view of the upper mold member 4 of the present embodiment.

The upper mold member 4 is provided, on the annular edge portion along the external circumference of the molding face, with a protruding portion 5 of a circumferential length corresponding to that of the notches at the upper end portion of the sleeve member 6.

Owing to the above-explained structure, upon the pressing operation, the thickness of the molded article is defined by the impingement of the annular edge portion of the external circumference of the molding face of the upper mold member 4 on the unnotched parts 12a, 12b, 12c of the upper end portion of the sleeve member 6, as shown in FIG. 1. The volatile component released from the molding material G by the high temperature at the pressing operation escapes from the molds through the gaps between the notches 10a, 10b, 10c of the upper end portion of the sleeve member 6 and the annular edge portion at the peripheral circumference of the molding face of the upper mold member 4, so that, even after repeated molding operations, the molded article and the mold members are maintained in satisfactory surface state and the service life of the mold members is extended.

The protruding portion 5 provided on said upper mold member 4 engages with one of three notches 10a, 10b, 10c at the upper end portion of the sleeve member 6 (said engagement taking place with the notch 10a in FIGS. 1 and 2), whereby the upper mold member 4 is prevented from rotation around the longitudinal direction of the sleeve member 6. However, the aforementioned gaps are not blocked by said engagement. Said engagement of the protruding portion 5 with one of the notches 10a, 10b, 10c is selected in such a manner that trial pressing operations are performed with respect to combinations with each of said notches in advance to obtain molded articles to examine the optical performance of the obtained molded articles, particularly eccentric image blur resulting from ununiform circumferential thickness of the lens, thereby selecting the molded article having the best performance.

In the present embodiment, since the lower mold member 2 is rendered movable vertically with respect to the sleeve member 6, said lower mold member 2 can follow the eventual shrinkage of the molded article in the course of cooling after the pressing operation, thereby ensuring satisfactory face precision in the molded article.

Figure 5:
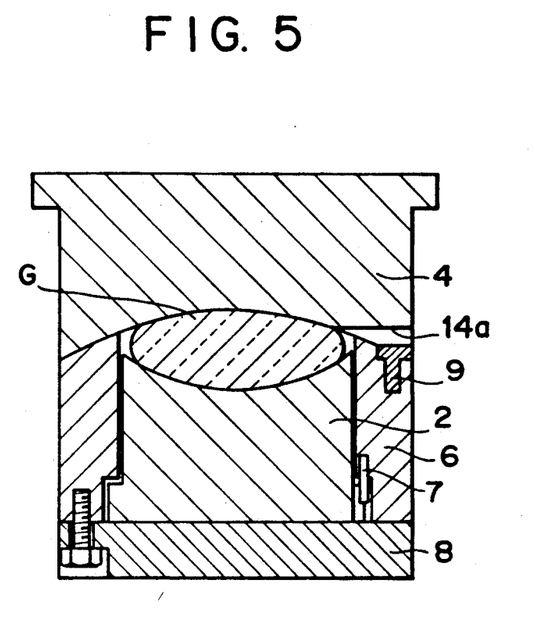
FIG. 5 is a longitudinal cross-sectional view of a mold structure for press molding, constituting a second embodiment of the present invention.
Figure 6:
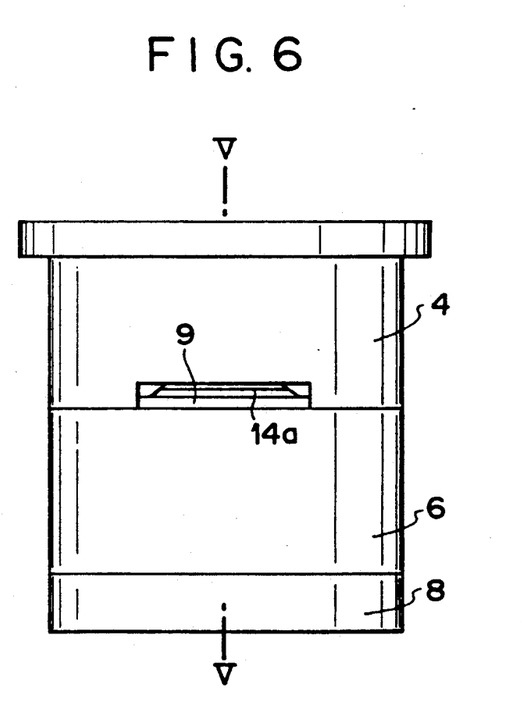
FIG. 6 is an elevation view of FIG. 5.
Figure 7:
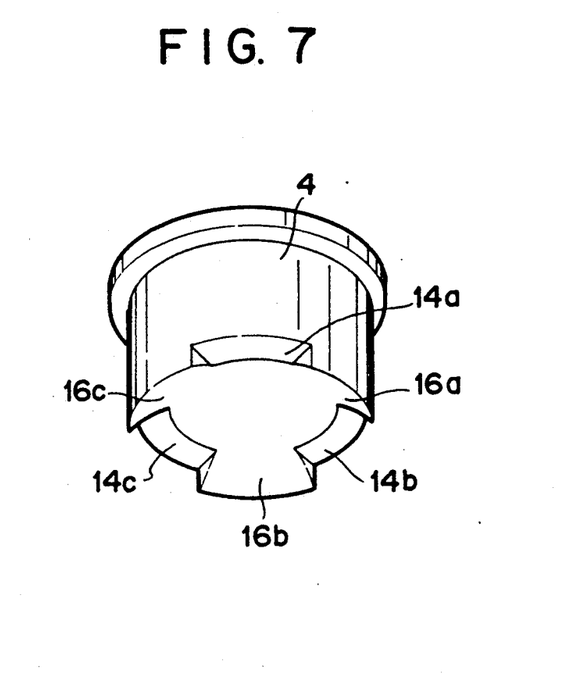
FIG. 7 is a perspective view of an upper mold member of said second embodiment.
Figure 8:
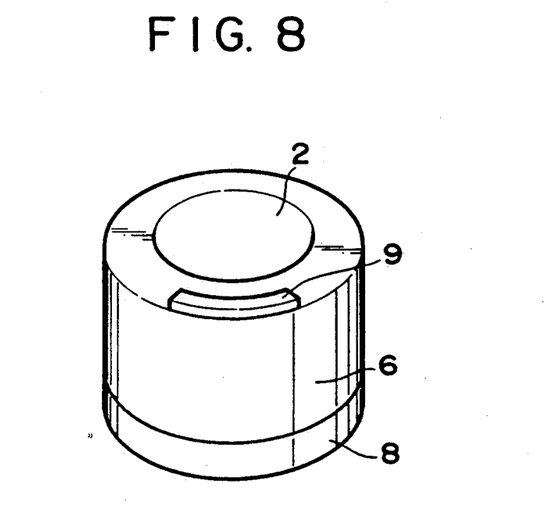
FIG. 8 is a perspective view of said second embodiment, in which the upper mold member and the molding material are not shown.

FIG. 5 is a longitudinal cross-sectional view of a mold structure for press molding, constituting a second embodiment of the present invention, and FIG. 6 is an elevation view thereof. FIG. 5 corresponds to a cross section along a line V—V in FIG. 6. In these drawings, same components as those in FIGS. 1 to 4 are represented by same numerals. FIG. 7 is a perspective view of the upper mold member 4 of the present embodiment, and FIG. 8 is a perspective view of the present embodiment, wherein the upper mold member 4 and the molding material G are not shown.

In the present embodiment, three notches 14a, 14b, 14c are formed on the annular edge portion at the external circumference of the molding face of the upper mold member 4. Unnotched parts 16a, 16b, 16c of said annular edge portion are adapted to impinge on the annular upper end portion of the sleeve member 6 upon the pressing operation. Said notches 14a, 14b, 14c and said unnotched parts 16a, 16b, 16c have a same circumferential length.

On the annular upper end portion of the sleeve member 6, there is provided a protruding portion 9 of a circumferential length corresponding to that of the notches on the annular edge portion of the molding face of the upper mold member 4.

In the present embodiment, the functions of the annular edge portion at the peripheral circumference of the molding face of the upper mold member 4 and the upper end portion of the sleeve member 6 are inverted in comparison with those in the first embodiment, but the effects and advantages of the present embodiment are equivalent to those of the first embodiment.

As explained in the foregoing, according to the mold structure for press molding of the first and second embodiments, a notch or notches are formed in either of the annular upper end portion of the sleeve member and the annular edge portion of peripheral circumference of the molding face of the upper mold member to make a gap or gaps when the upper mold member impinges on the sleeve member, so that the thickness of the molded article can be precisely defined. Also, the volatile component generated from the molding material by the high temperature upon the pressing operation escapes from the molds through said gaps, whereby the molded article and the mold members can be maintained at a satisfactory surface state even after repeated molding operations and the service life of the mold members can be extended.

In the following there will be explained a third embodiment of the present invention, applied to the press molding of an optical lens and shown in the attached drawings.

Figure 9A:
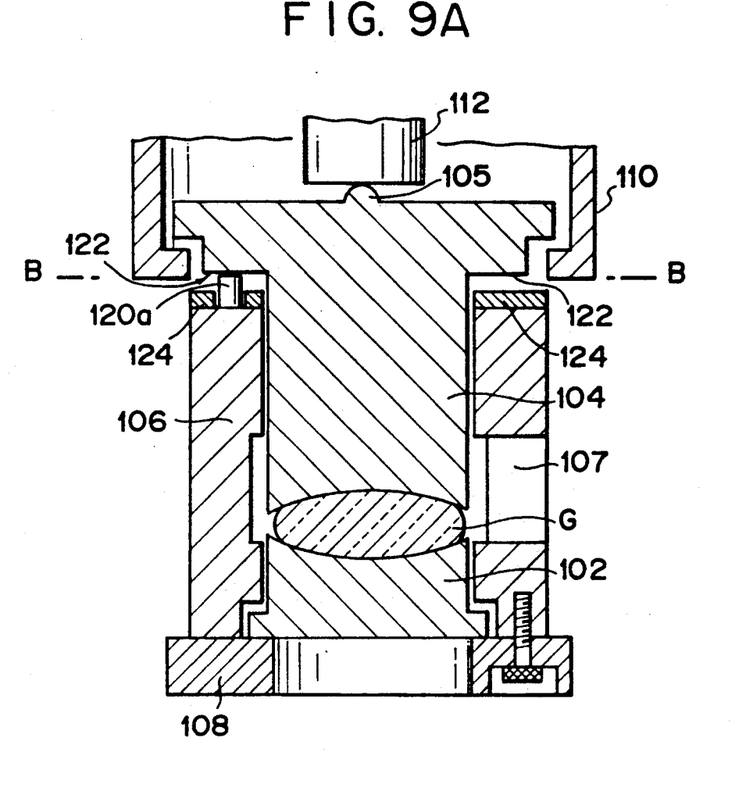
FIG. 9A is a longitudinal cross-sectional view of a mold structure for press molding, constituting a third embodiment of the present invention.
Figure 9B:
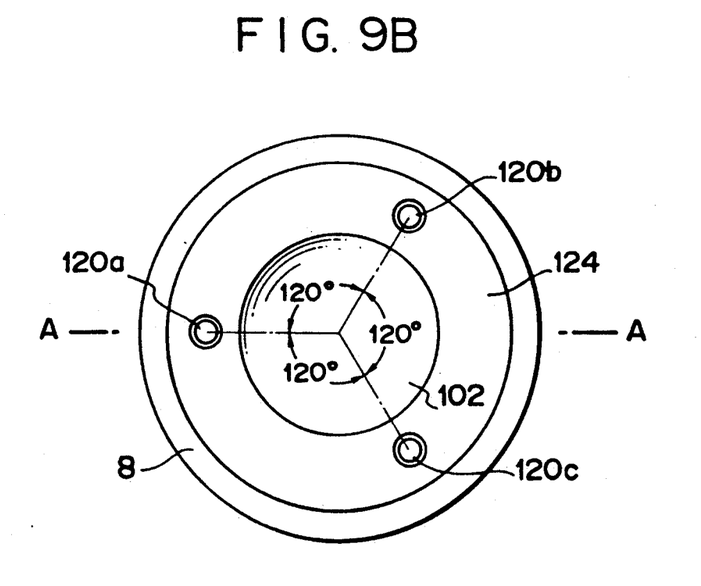
FIG. 9B is a partially abbreviated cross-sectional view along a line B—B in FIG. 9A.

FIG. 9A is a longitudinal cross-sectional view of a mold structure for press molding, constituting a third embodiment of the present invention, and FIG. 9B is a partially abbreviated cross-sectional view along a line B—B in FIG. 9A. FIG. 9A corresponds to a cross section along a line A—A in FIG. 9B.

In these drawings, a lower mold member 102 is provided with an upper molding face finished with a desired surface precision, in order to transfer and form a first optically functional face of a lens. Said molding face may be aspherical. An upper mold member 104 is provided with a lower molding face finished with a desired surface precision, in order to transfer and form a second optically functional face of the lens. Said molding face may be aspherical. These mold members 102, 104 constitute paired mold members.

A sleeve member 106 supports said lower and upper mold members 102, 104 in vertically slidable manner. Said sleeve member 106 is provided, at the side thereof, with an aperture 107 for introduction of the molding material and removal of the molded article.

At the lower end of the sleeve member 106 there is fixed a support plate 108, which limits the movement of said lower mold member 102 in the downward direction. Said support plate 108 is mounted on a molding machine (not shown).

A holder 110 for supporting said upper mold member 104 can engage with an upper flange portion thereof. A rod 112 for pressing said upper mold member 104 downwards is provided on the molding machine. On said upper mold member 104 and on the vertical axis of the sleeve member 106 there is provided a projection 105 for receiving the pressing force from above.

A ring member 124 is mounted on the horizontal upper end face of said sleeve member 106.

G denotes the molding material.

FIG. 9B is a cross-sectional view along a line B—B in FIG. 9A, wherein the upper mold member 104 is not shown. As shown in FIG. 9B, said ring member 124 is provided with three penetrating holes, in which three pins 120a, 120b, 120c are detachably inserted. These three pins are positioned with an angular distance of 120° about the vertical axis of the sleeve member, and the upper ends thereof are positioned in a horizontal plane. Said pins 120a to 120c have a diameter sufficiently withstanding the pressing pressure, thus being free from eventual bending upon the pressing operation.

As shown in FIG. 9A, the upper mold member 104 is provided, at the upper end thereof, with a flange extending on the upper end face of said sleeve member 106, and the lower face of said flange constitutes an impinging face 122. Said impinging face lies also in a plane perpendicular to the vertical direction, namely in a horizontal plane.

The structure of the present embodiment functions in the following manner.

Figure 10:
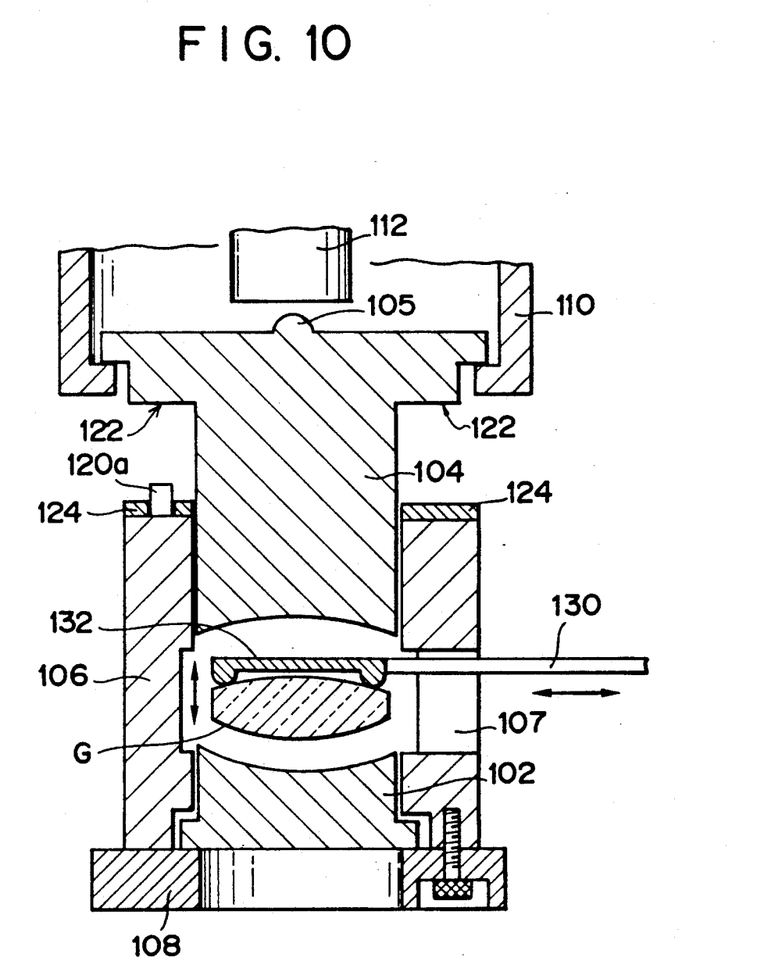
FIG. 10 is a cross-sectional view of said third embodiment, showing a state of introduction of a molding material G into the molds prior to the pressing operation.

FIG. 10 is a cross-sectional view showing the state of the present embodiment at the introduction of the molding material G into the molds prior to the pressing operation.

In this state, the pressing rod 112 and the holder 110 are moved upwards to hold and lift the upper mold member 104 by means of said holder 110. Then, in the state that the molding material G is supported by suction with a suction unit 132 provided at the end of said transport arm, a transport arm 130 is horizontally moved to insert said suction unit 132 into the molds through the aperture 107 of the sleeve member 106. Then, after said arm 130 is slightly moved downwards, the suction unit 132 is deactivated to place the molding material G on the upper face of the lower mold member 102. The arm 130 is then moved horizontally to retract the suction unit 132 from the molds.

FIG. 9A shows the pressed state in which the pressing rod 112 and the holder 110 are moved downwards to press the upper projection of the upper mold member 104 downwards. In this state, the upper mold member 104 is no longer supported by the holder 110, and the lower mold member 102 is prevented from downward movement and is fixed in position by the support plate 108. Thus, the molding material G is pressed between the lower mold member 102 and the upper mold member 104, and the face 122 of the upper mold member 104 impinges on said pins 120a to 120c, whereby said upper mold member 104 is prevented from the downward movement and the thickness of the molded article is thus determined.

The molded article is then removed through steps similar to those for introduction of the molding material.

More specifically, the pressing rod 112 and the holder 110 are moved upwards to lift the upper mold member 104 by means of said holder 110. Then, the transport arm 130 is moved horizontally to insert the suction unit 132 into the molds through the aperture 107 of the sleeve member 106, and is slightly moved downwards to attract the molded article by suction. Subsequently, the transport arm 130 is slightly moved upwards and is moved in the horizontal direction to retract said suction unit 132 from the molds.

In the present embodiment explained above, since the movement of the upper mold member 104 is limited by the impingement of the impinging face 122 on the pins 120a to 120c of which lower face is supported by the upper end face of the sleeve member 106, the area of impingement is limited and the eventual presence of undesirable substance such as dusts in such impinging area can be practically precluded. Consequently, the thickness of the molded article can be set extremely precisely, and said impinging parts are scarcely damaged even after repeated molding operations. Therefore, the precision can be maintained satisfactorily, and the service life of the mold members can also be extended.

Said pins 120a to 120c need only to be merely inserted into the penetrating holes of the ring member 124, thus being easily mounted and detached. Also, the repair of said pins can be easily conducted after removal thereof.

Also, since both the upper end face of said sleeve member 106 and said impinging face 122 lie in planes perpendicular to the moving direction of the upper mold member 104, a sufficiently high precision can be obtained in the thickness of the molded article, even without rigorous setting of the pins 120a to 120c in the horizontal plane.

Besides the upper mold member 104 is provided thereon, on the vertical axis of the sleeve member 106, with a projection 105 for receiving the pressing force of the rod 112 from above, so that a uniform pressing force can be applied even when the pressing rod 112 is aberrated in the horizontal position, and the pins 120a to 120c can receive uniform forces.

In the present embodiment, since the lower mold member 102 is rendered movable vertically with respect to the sleeve member 106, said lower mold member 102 can follow the eventual shrinkage of the molded article in the course of cooling after the pressing operation, thereby ensuring satisfactory face precision in the molded article.

As explained above, according to the mold structure for press molding of the present embodiment, at least three pins to be contacted with impingement face on small contact area are employed, so that constantly precise adjustment of stop position of the lower and upper mold members in the relative movement thereof can be performed upon pressing operation, thereby maintaining a satisfactory precision in the thickness of the molded article and also maintaining a long service life of the mold members.

Also, according to said structure, the pins are merely inserted in the penetrating holes of the ring member and can therefore be easily mounted or detached, and the repair of the pins can be easily made after the removal of said pins.

What is claimed is:

1. A mold for press molding, including an upper mold member and a lower mold member in a sleeve member so as to be slidable in a longitudinal direction of the sleeve member, comprising:
   means for limiting a movement of said lower mold member with respect to said sleeve member in a direction in which said lower mold member is separated from said upper mold member; and
   a ring member mounted on an upper end face of said sleeve member, said ring member being provided with at least three penetrating holes in the longitudinal direction of said sleeve member, pins with same length being detachably inserted respectively in said penetrating holes;
   wherein said upper mold member is provided with an impinging face to be brought into contact with said pins for setting a thickness of a molded article.

2. A mold according to claim 1, wherein said penetrating holes are uniformly spaced at same interval along a circumference of the ring member.

3. A mold according to claim 2, wherein said upper mold member is provided with a protruding part for receiving a pressing force applied thereto from above at an upper part of the upper mold member and on a vertical center axis of the sleeve member.

4. A mold according to claim 2, wherein both an upper end face of said sleeve member and the impinging face of said upper mold member lie in planes perpendicular to the longitudinal direction of said sleeve member.

* * * * *

UNITED STATES PATENT AND TRADEMARK OFFICE
CERTIFICATE OF CORRECTION

PATENT NO. : 5,211,969
DATED : May 18, 1993
INVENTOR(S) : FUMITAKA YOSHIMURA

It is certified that error appears in the above-indentified patent and that said Letters Patent is hereby corrected as shown below:

<u>COLUMN 3</u>
    line 5, "protruding" should read --protruding part--; and
    line 17, "provided" should read --provided with--.

Signed and Sealed this

Seventh Day of June, 1994

Attest:

BRUCE LEHMAN

Attesting Officer      Commissioner of Patents and Trademarks